(12) United States Patent
Akamatsu et al.

(10) Patent No.: US 10,163,052 B2
(45) Date of Patent: Dec. 25, 2018

(54) RF TAG

(71) Applicant: TOYO SEIKAN GROUP HOLDINGS, LTD., Tokyo (JP)

(72) Inventors: Shinya Akamatsu, Kanagawa (JP); Hironaga Shimizu, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 14 days.

(21) Appl. No.: 15/787,893

(22) Filed: Oct. 19, 2017

(65) Prior Publication Data

US 2018/0060718 A1 Mar. 1, 2018

Related U.S. Application Data

(63) Continuation of application No. PCT/JP2016/001973, filed on Apr. 11, 2016.

(30) Foreign Application Priority Data

Apr. 22, 2015 (JP) .................. 2015-087965

(51) Int. Cl.
*G06K 19/07* (2006.01)
*G06K 19/077* (2006.01)

(52) U.S. Cl.
CPC ..... *G06K 19/07749* (2013.01); *G06K 19/077* (2013.01); *G06K 19/0723* (2013.01)

(58) Field of Classification Search
CPC ............ G06K 19/0723; G06K 19/07749
USPC ........................................ 235/492
See application file for complete search history.

(56) References Cited

U.S. PATENT DOCUMENTS

| | | | | |
|---|---|---|---|---|
| 9,697,459 B2* | 7/2017 | Finn | .................. | B23K 26/361 |
| 2014/0247188 A1 | 9/2014 | Nakano et al. | | |
| 2014/0361086 A1* | 12/2014 | Finn | .................. | B23K 26/361 |
| | | | | 235/488 |
| 2015/0090801 A1* | 4/2015 | Omura | .............. | H01Q 1/2225 |
| | | | | 235/492 |
| 2015/0108221 A1 | 4/2015 | Akamatsu et al. | | |
| 2015/0108222 A1 | 4/2015 | Shimizu et al. | | |
| 2016/0380338 A1 | 12/2016 | Nakano et al. | | |

FOREIGN PATENT DOCUMENTS

| | | | |
|---|---|---|---|
| JP | 2007-135183 A | 5/2007 |
| JP | 2008-123196 A | 5/2008 |
| JP | 2011-204130 A | 10/2011 |
| JP | 2014-7655 A | 1/2014 |

(Continued)

OTHER PUBLICATIONS

International Search Report issued in International Application No. PCT/JP2016/001973; dated May 17, 2016 (2 pages).

(Continued)

*Primary Examiner* — Toan Ly
(74) *Attorney, Agent, or Firm* — Osha Liang LLP (57) ABSTRACT

An RF tag that includes an inlay (made of an IC chip and an antenna) and a housing that houses the inlay therein. Furthermore, the housing comprises a top cover that covers at least an upper surface side of the inlay, the top cover is made of a predetermined metal material, the top cover includes a cutaway that opens in the upper surface side of the inlay, and the top cover is electrically connected to the inlay to function as an auxiliary antenna of the inlay.

5 Claims, 8 Drawing Sheets

(56) References Cited

FOREIGN PATENT DOCUMENTS

| JP | 2014-194596 A | 10/2014 |
|---|---|---|
| WO | 2014/050553 A1 | 4/2014 |

OTHER PUBLICATIONS

International Preliminary Report on Patentability issued in International Application No. PCT/JP2016/001973; dated Nov. 2, 2017 (6 pages).

* cited by examiner

RF TAG

TECHNICAL FIELD

One or more embodiments of the present invention relate to an RF tag which is attached to each of arbitrary articles and objects, e.g., electric meters and freight containers, and more particularly, to an RF tag further having an auxiliary antenna laminated on an inlay including an IC chip and an antenna.

BACKGROUND

In general, for each of arbitrary articles and objects, there is widely used a so-called RF tag which incorporates an IC chip to store predetermined information concerning the articles and objects in a readable and writable manner. The RF tag is also called an RFID (radio frequency identification) tag, an IC tag, a contactless tag or the like, and is a micromini communication terminal provided by forming, into a tag (a label) shape, a so-called inlay (an inlet) which has an electronic circuit including an IC chip and a wireless antennal sealed by or coated with a base material such as a resin film. Thus, the communication terminal is configured to wirelessly enable a read-only operation, a write-once operation and a read/write operation of predetermined information from/to the IC chip in the tag by using a reader/writer.

Afterward, the RF tag including the predetermined information is attached to each of the arbitrary articles and objects, the information recorded in the RF tag is picked up by the reader/writer, and then the information recorded in the tag can be recognized, output, displayed and updated as the predetermined information concerning each of the attached articles and the like.

Such an RF tag enables recording data of hundreds of bits to kilos of bits in a memory of the IC chip, and thus a sufficient information amount of the information can be recorded as the information concerning each of the articles and the like. In addition, since communication can be performed in a contactless manner on the reader/writer side, there are not worries about abrasion of a contact, scratches, contamination and the like, and moreover, since a power supply to the tag itself is unnecessary, the tag can be processed, miniaturized and thinned in conformity to a shape and size of the objects to be used.

When such an RF tag is used, there can be recorded various pieces of information concerning each of the articles to which the tag is attached, e.g., a name, an identification symbol, contents, components, an administrator, a user, or a use state and a use situation of the article. Thus, the various pieces of information of such a great amount as to be impossible by characters and a barcode printed and displayed on a label surface can be correctly read or written by only attaching the miniaturized/thinned tag to each of the articles.

Here, as such an RF tag, an RF tag which is called a general-purpose inlay (an inlet) and has an IC chip and an antenna just coated with a film is widely used. This type of inlay is small and thin, it can be easily attached to any object without taking up a space and immediately used as the RF tag, and hence it has widely spread in recent years.

However, such a general-purpose inlay has the IC chip and the antenna simply coated with a film, and hence it can be a cause of a failure, a malfunction, fracture, and others as it is when impact or the like is applied from the outside. For example, a freight pallet or container is constantly subject to physical/mechanical external force/impact, and there is a possibility that the RF tag attached to such an object for use easily fails/fractures if it remains in an inlay state.

Thus, as to the RF tag used in an environment where such external force is readily applied, the general-purpose inlay is housed in a predetermined cover, case, or housing to protect the inlay from the physical/mechanical impact or the like.

For example, Patent Literature 1 suggests an RFID tag in which a general-purpose inlay is held in a protective metal plate having a U-shape cross section for protection.

Further, Patent Literature 2 suggests an RFID tag in which a general-purpose inlay sealed by a non-conductive material is embedded in a hollow slot of a metal holder.

When the general-purpose inlay is housed/sealed in the protective plate or the holder, the inlay can be protected from the surrounding environment, and the inlay can be protected so that it can be prevented from, e.g., easily failing/fracturing due to the physical/mechanical external force, impact, collision, or the like applied from the outside in particular.

CITATION LIST

Patent Literature

Patent Literature 1: Japanese Unexamined Patent Application Publication No. 2011-204130
Patent Literature 2: Japanese Unexamined Patent Application Publication No. 2007-135183

However, in the technologies suggested in Patent Literatures 1 and 2, a loop circuit provided in the general-purpose inlay is not taken into consideration.

In the general-purpose inlay, as a basic configuration, the loop circuit is formed near the IC chip. This loop circuit is intended to achieve impedance matching of the IC chip and an antenna and provided to perform communication using a magnetic field component, and this magnetic field component of the loop circuit must be prevented from being inhibited to maintain communication characteristics of the inlay.

However, in the technology of Patent Literatures 1 and 2, the above-described loop circuit is not taken into consideration, and the entire inlay is just accommodated in the metal protective plate or the holder. Thus, when the inlay is accommodated in the metal protective plate or the holder, the magnetic field component of the loop circuit is affected by the metal protective plate or the holder, and there is a possibility that the excellent wireless communication cannot be performed.

Further, in Patent Literatures 1 and 2, further providing an auxiliary antennal to the general-purpose inlay is not taken into consideration either.

In case of using the general-purpose inlay as the RF tag, when the auxiliary antenna is further laminated, a wireless communication length of the general-purpose inlay can be increased or the wireless communication can be performed in an arbitrary frequency band in some situations.

However, when such an inlay and auxiliary antenna are accommodated in the metal protective plate or the holder such as those suggested in Patent Literatures 1 and 2 as they are, the entire inlay and auxiliary antenna are electrically shielded/interrupted by the metal case.

SUMMARY

In one or more embodiments, the present application is for an RF tag which protects an inlay from the surrounding environment by housing the inlay in a metal housing, and can excellently perform wireless communication of the inlay by exploiting a function of the auxiliary antenna.

That is, one or more embodiments of the present invention relate to an RF tag which houses an inlay including an IC chip and an antenna in a metal housing, allows the housing to function as an auxiliary antenna of the housed inlay, and enables performing wireless communication in an excellent state with the outside of the housing by using the auxiliary antenna while assuredly protecting the inlay from the physical/mechanical external force, impact, or the like.

An RF tag of one or more embodiments of the present invention is constituted by an inlay comprising an IC chip and an antenna, and a housing which houses the inlay therein, wherein the housing comprises a top cover which covers at least an upper surface side of the inlay, and the top cover is made of a predetermined metal material, includes a cutaway part which opens in a part of the upper surface side of the inlay, and is electrically connected with the inlay to function as an auxiliary antenna of the inlay.

According to one or more embodiments of the present invention, the inlay including the IC chip and the antenna is housed in the metal housing, the housing is allowed to function as the auxiliary antenna of the housed inlay, and the wireless communication can be thereby performed in an excellent state with the outside of the housing by using the auxiliary antenna while assuredly protecting the inlay or the antenna from the physical/mechanical external force, the impact, or the like.

Thus, according to one or more embodiments of the present invention, it is possible to realize the RF tag which is suitable for a general-purpose inlay used for an object to which the physical force or impact is often applied from the outside in particular, e.g., a freight pallet or container.

BRIEF DESCRIPTION OF DRAWINGS

FIGS. 1A and 1B are perspective views each showing an RF tag according to one or more embodiments of the present invention in a completed state where an inlay is housed in a housing, where FIG. 1A shows a state seen from a housing plane side and FIG. 1B shows a state seen from a housing bottom surface side;

FIGS. 4A and 4B are plan views each showing the top cover of the housing which becomes as an auxiliary antenna of the RF tag according to one or more embodiments of the present invention, where FIG. 4A shows a state where the top cover is laminated on the inlay, and FIG. 4B shows a dimensional relationship of the auxiliary antenna constituted of the top cover;

FIGS. 6A and 6B are cross-sectional front views each showing the RF tag according to one or more embodiments of the present invention, where FIG. 6A shows a case where a protective member is arranged only on a lower surface side of the inlay, and FIG. 6B shows a case where the protective member is arranged only on an upper surface side of the inlay;

FIGS. 7A to 7C show cases where the protective member protecting the upper surface of the inlay includes a convex portion which closes a cutaway part of a housing in the RF tag according to one or more embodiments of the present invention respectively, where FIGS. 8A to 8C are line charts showing communication characteristics of the RF tag according to one or more embodiments of the present invention and showing a relationship between a communication distance and a frequency, where FIG. 8A shows a case where the tag is attached to a metal object, FIG. 8B shows a case where the tag is fixed to the metal object by screwing, and FIG. 8C shows a case where the communication characteristics of the RF tags in FIGS. 6A and 6B are compared.

DETAILED DESCRIPTION OF EMBODIMENTS

One or mare embodiments of an RF tag according to the present invention will now be described hereinafter with reference to the drawings and the particular embodiments therein.

Figure 1A:
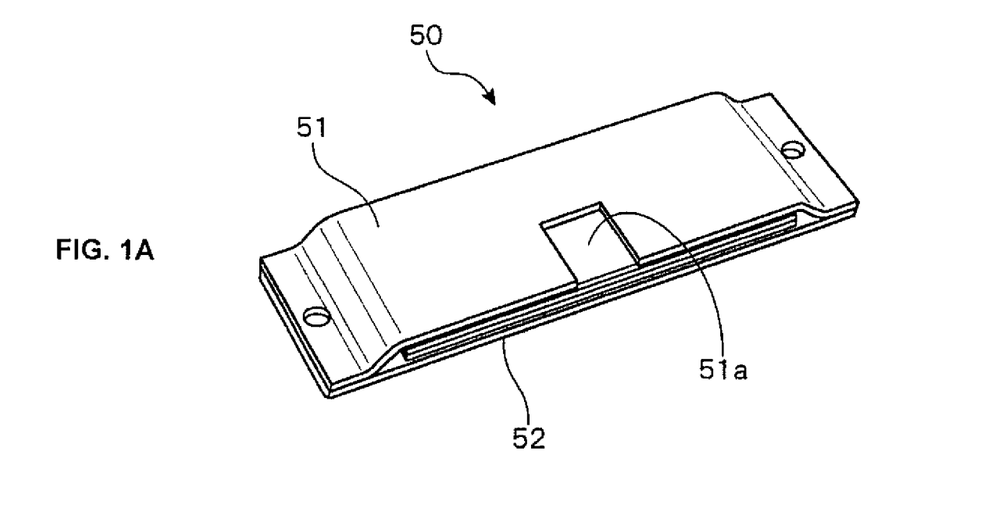
Figure 1B:
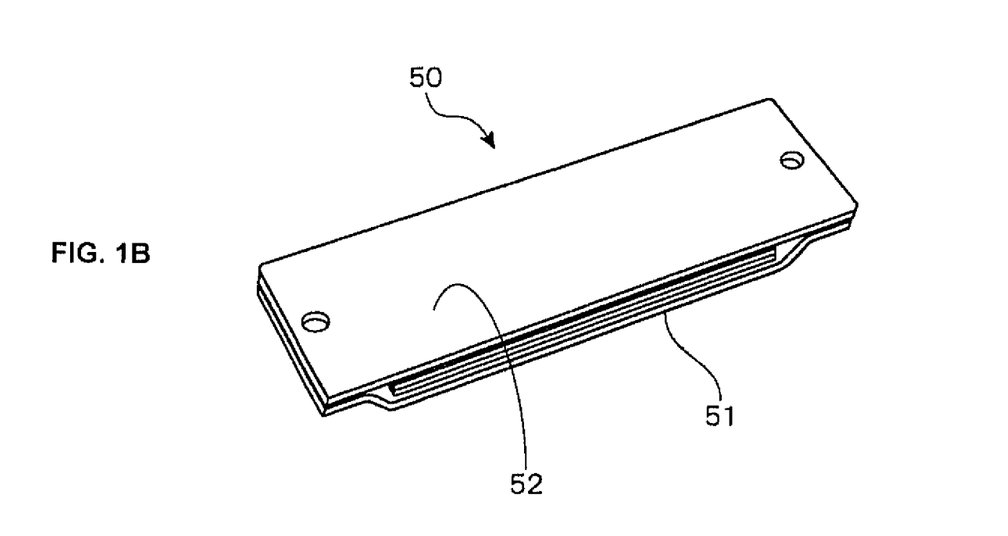
Figure 2:
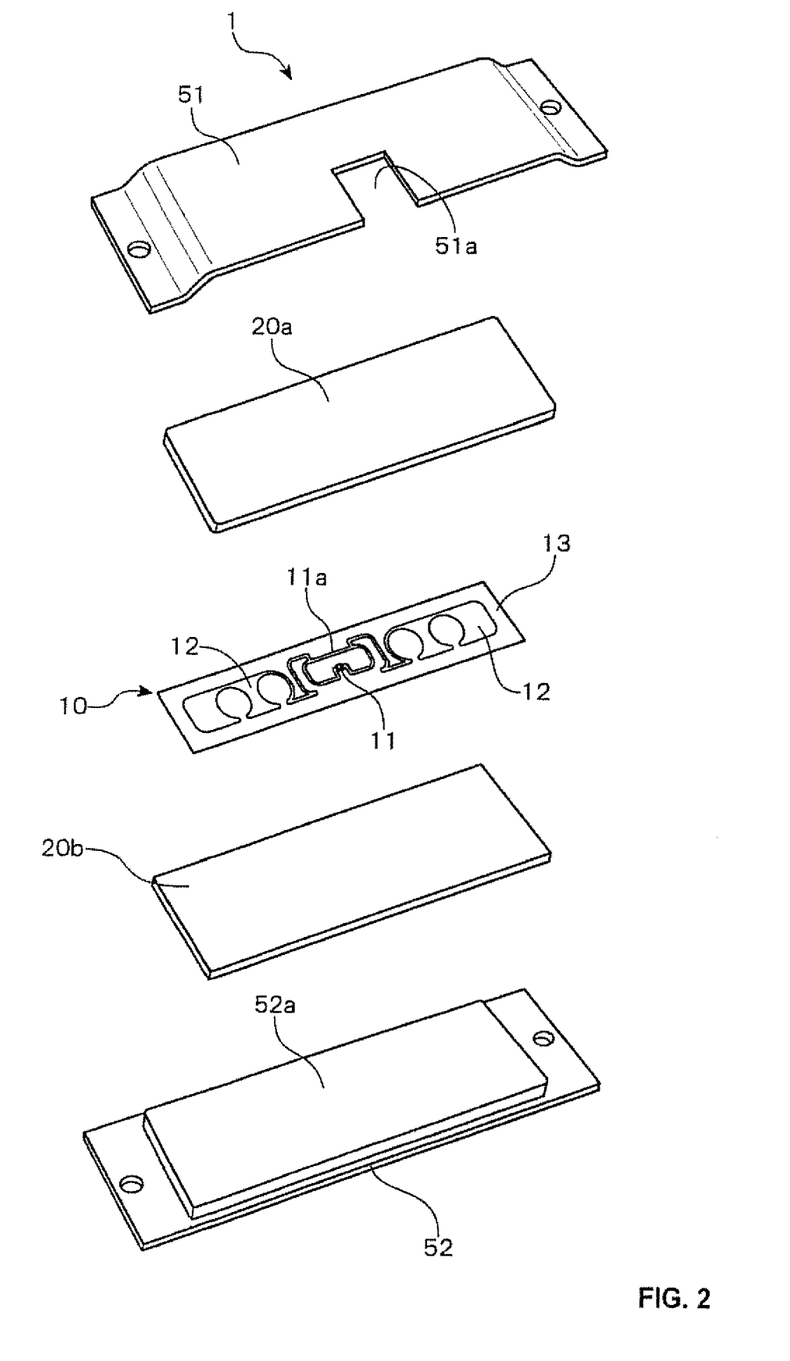
FIG. 2 is a perspective view of a state where a top cover and a back cover of a housing, an inlay, and a protective member of the RF tag shown in FIG. 1A are all disassembled.

FIGS. 1A and 1B are perspective views showing an RF tag 1 according to an embodiment of the present invention in a completed state where an inlay 10 is housed in a housing 50, and FIG. 2 is an exploded perspective view of the RF tag 1 according to an embodiment of the present invention.

Figure 3A:
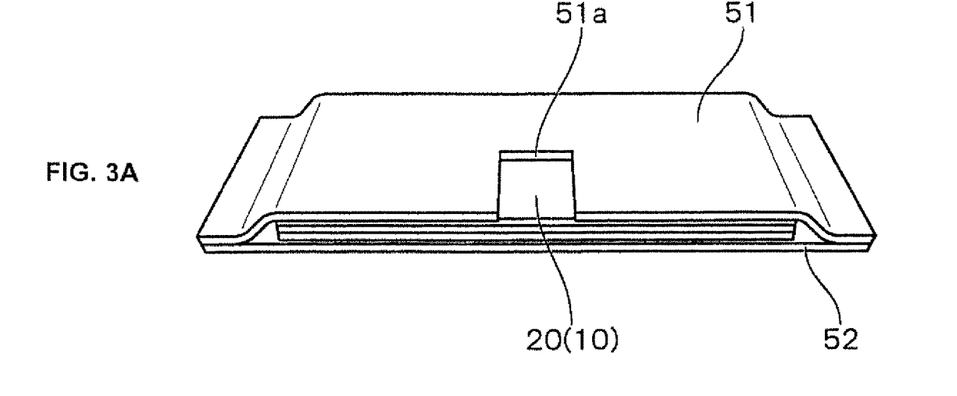
FIGS. 3A to 3C are appearance perspective views showing examples where the top cover of the housing according to one or more embodiments of the present invention has different shapes, respectively.
Figure 3B:
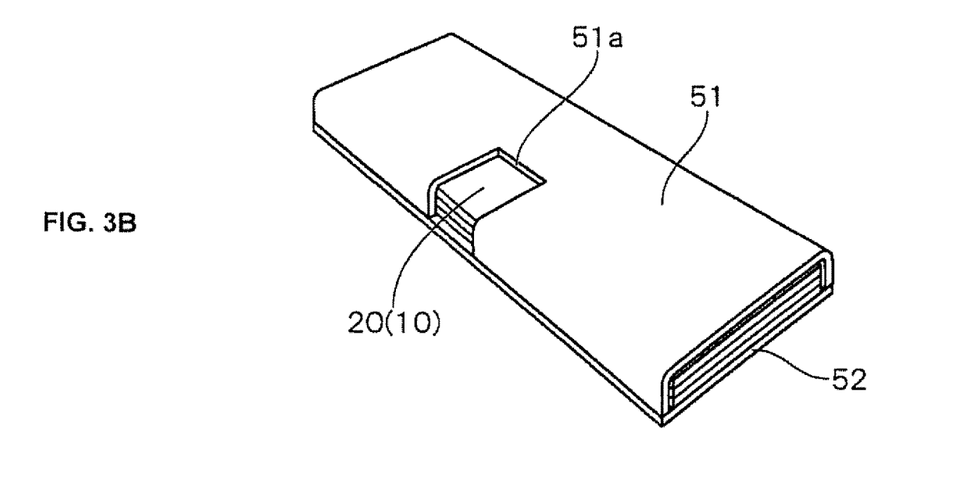
Figure 3C:
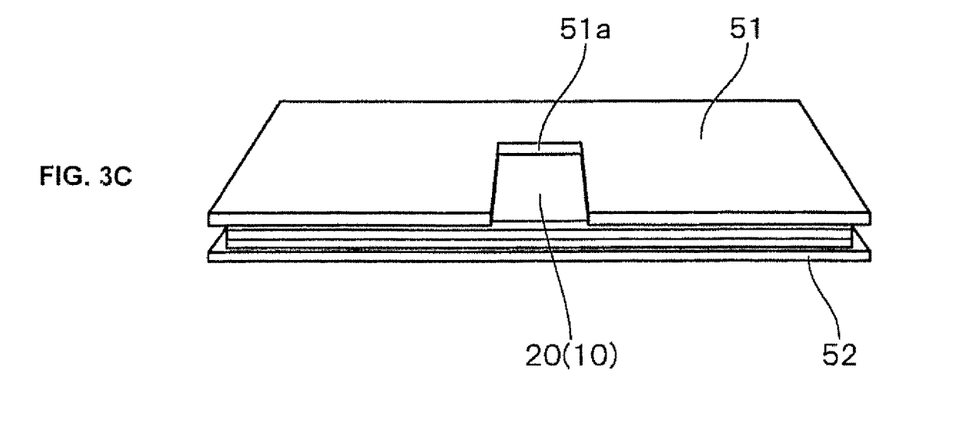

Furthermore, FIGS. 3A to 3C are appearance perspective views showing examples where a shape of a top cover 51 of the housing 50 according to one or more embodiments of the present invention has different shapes, respectively.

As shown in these drawings, an RF tag 1 according to this embodiment is an RF tag having a configuration where an inlay 10 constituting the RF tag which performs wireless communication is housed in a housing 50 and protected, and the inlay 10 is protected by the housing 50 from the external environment. In particular, since at least a top cover 51 of the housing 50 which houses the inlay 10 is formed of a metal member in this embodiment, durability, shock resistance, pressure resistance, and the like against physical force such as impact or a pressure applied to the housing 50 from the outside are improved so that the inlay 10 does not fail/fracture by external force or impact.

Moreover, in this embodiment, such a housing 50 itself is configured to function as an auxiliary antenna for the inlay 10, whereby communication characteristics of the RF tag 1 can be maintained in/improved to an excellent state.

Specifically, as shown in FIG. 2, the RF tag 1 according to this embodiment includes the inlay 10 provided with an IC chip 11 and an antenna 12, a protective member 20 (20a and 20b) to protect this inlay 10, and a housing 50 (51 and 52) which accommodates the inlay 10 protected by the protective member 20.

Additionally, in this embodiment, the housing 50 is formed of a metal member, and a top cover 51 of the housing 50 is configured to function as the auxiliary antenna of the inlay 10 housed in the housing 50.

Each portion will now be described hereinafter in detail.

The inlay 10 constitutes the RF tag which enables a read-only operation, a write-only operation, and a read/write operation of predetermined information in a wireless manner with a non-illustrated reader/writer (a reading/writing device), and there are, e.g., a read-only type, a write-once type, and a read/write type.

Specifically, the inlay 10 has the IC chip 11 and the antenna 12 which is electrically conductive/connected to the IC chip 11, and the IC chip 11 and the antenna 12 are mounted and formed on one sealing film 13 made of, e.g., a PET resin functioning as a base material, then another sealing film 13 is overlapped, and the IC chip 11 and the antenna 12 are sealed/protected in a state where they are held between the two sealing films 13.

In this embodiment, there is used the rectangular inlay 10 which comprises the IC chip 11, the antennas 12 extending on both sides of the IC chip 11, and the rectangular sealing film 13 to hold/seal the IC chip 11 and the antennas 12.

The IC chip 11 is formed of a semiconductor chip of a memory or the like and can record data of, e.g., hundreds of bits to kilos of bits.

A loop-like circuit conductor is connected to the IC chip 11 to surround a chip periphery, whereby the loop part 11a is formed, and the antenna 12 is connected to both left and right sides of the IC chip 11 through this loop part 11a.

Furthermore, a read/write operation (data calling, registration, deletion, updating, and the like) from/to the non-illustrated reader/writer through this antenna 12 and the later-described auxiliary antenna 20 is performed by the wireless communication, and data recorded in the IC chip 11 is recognized.

As the data recorded in the IC chip 11, arbitrary data such as an identification code, a name, a weight, contents, a manufacturer/seller name, a manufacturing site, a manufacturing date, an expiration date, and the like of a commercial product can be recorded and rewritten.

The antenna 12 is formed by, e.g., etching a conductive ink film or a metal thin film such as an aluminum-metallized film having conductive properties into a predetermined shape/dimension (a length and an area), on a surface of one sealing film 13 as a base material.

It is possible that the sealing film 13 is made of a film material having flexibility such as polyethylene, polyethylene terephthalate (PET), polypropylene, polyimide, polyvinyl chloride (PVC), or an acrylonitrile-butadiene-styrene resin (ABS) and the IC chip 11/antenna 12 to be sealed is made of, e.g., a transparent PET resin which can be visually confirmed from the outside. Furthermore, an adhesive layer/bonding layer can be provided on one film surface of the sealing film 13 to enable attachment to the base material or each of articles.

As a communication frequency band used by the inlay 10, in the RF tag 1 according to this embodiment, for example, a band of 860 M to 960 MHz belonging to the UHF band can be covered.

As frequency bands generally used by the RF tag, there are several types of frequency bands, e.g., a band of 135 kHz or less, a band of 13.56 MHz, a band of 860 M to 960 MHz belonging to the UHF band, and a band of 2.45 GHz. Thus, a communication distance which enables the wireless communication differs depending on a frequency band to be used, and an optimum antenna length or a wiring pattern differs depending on a frequency band.

In this embodiment, since the inlay 10 can be miniaturized and the top cover 51 of the housing 50 functions as the auxiliary antenna, the UHF band which has a short wavelength and enables miniaturization of the antenna, e.g., the 860 MHz band or the 920 MHz can be covered, and the excellent communication characteristics can be provided in these frequency bands.

However, if there is no, e.g., a size restriction of the inlay 10 or the housing 50, technical ideas themselves according to the present invention are not restricted to a specific frequency band, and can be applied to, e.g., arbitrary frequency bands other than the UHF band as a matter of course.

[Protective Member]

The protective member 20 serves as a base material/base on which the above-described inlay 10 is mounted, and it is protecting means for protecting an upper surface and/or a lower surface of the inlay 10.

In this embodiment, for example, as shown in FIG. 2, the protective member 20 (20a and 20b) can be constituted of two rectangular tabular members 20a and 20b which cover the upper surface and the lower surface of the inlay 10 and are a size larger than the inlay 10.

It is to be noted, as will be described later, the protective member 20 could protect any one of the upper surface and the lower surface of the inlay 10 (see FIGS. 5 to 7).

Figure 5A:
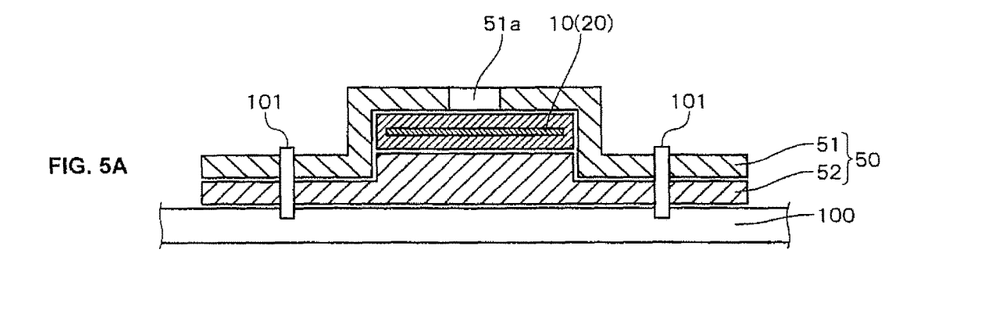
FIGS. 5A to 5C are cross-sectional front views each showing the RF tag according to one or more embodiments of the present invention, and show examples of different laminating structures in the housing.
Figure 5B:
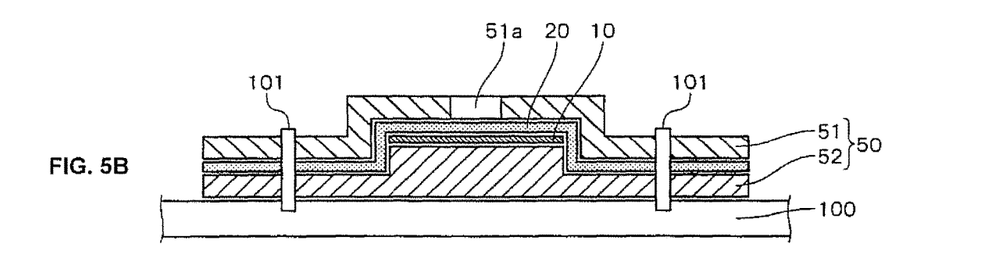
Figure 5C:
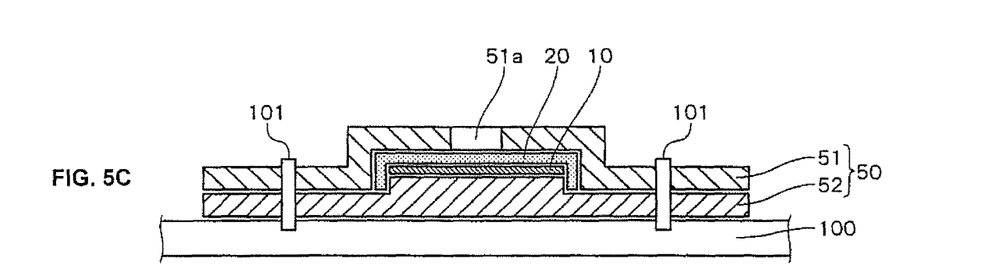

Further, the protective member 20 is not restricted to such two separate tabular members as shown in FIG. 2, and it may be made of, e.g., a resin material which resin-seals the entire inlay 10 or may be formed of a resin member which is fitted and fused on an upper surface of the inlay 10 housed in the housing 50 (see FIGS. 5A to 5C).

Figure 7A:
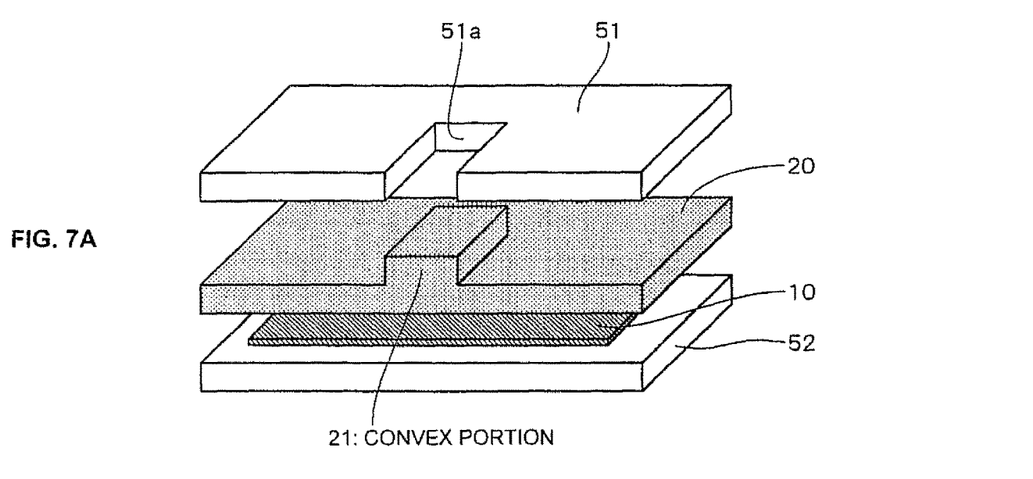
FIG. 7A is an exploded perspective view of a case where the cutaway part is placed at a substantial center of a housing front surface.
Figure 7B:
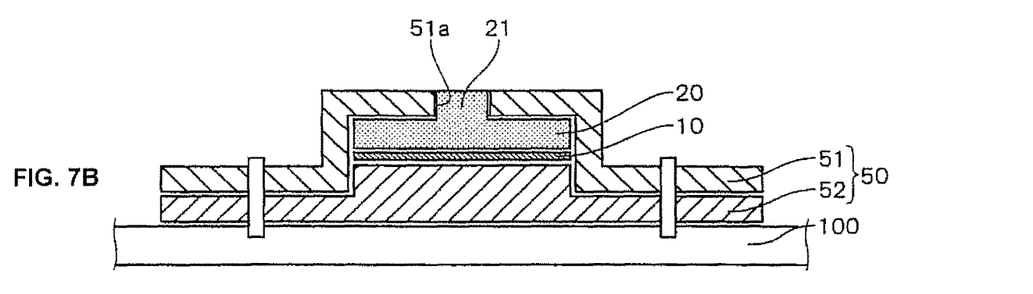
FIG. 7B is a cross-sectional front view of FIG. 7A.
Figure 7C:
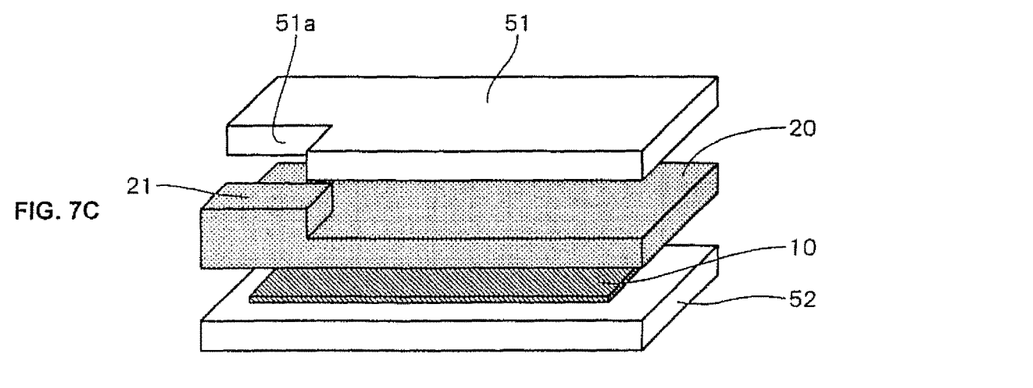
FIG. 7C is an exploded perspective view of a case where the cutaway part is placed on one end side of the housing in a longitudinal direction.

Furthermore, when the protective member 20 is arranged on the upper surface side of the inlay 10, it may include a convex portion 21 which engages/is fitted in a cutaway part 51a provide in the top cover 51 of the housing 50 (see FIGS. 7A to 7C).

A change example/application example of the embodiment of the protective member 20 will be described later with reference to later-described FIGS. 5 to 7.

When such a protective member 20 is provided, since the upper surface or the lower surface of the inlay 10 is covered with the protective member 20 at the time of housing the inlay 10 in the later-described housing 50, cushioning properties, waterproof properties/heat resistance, and the like for the inlay 10 can be improved, the protection of the inlay 10 can become more appropriate.

Furthermore, since the housing 50, especially the top cover 51 is made of a metal material, the protective member 20 can function as a dielectric constant adjusting layer which adjusts an influence of the metal material on the inlay 10 to provide the excellent communication properties.

Here, in this embodiment, the top cover 51 of the housing 50 functions as the auxiliary antenna of the inlay 10 as will be described later. Thus, to allow the protective member 20 to function as the dielectric constant adjusting layer which adjusts the communication characteristics of such an inlay 10, a material or a shape of the protective member 20 can be set so that a predetermined dielectric constant can be provided.

Specifically, as substances/materials of the protective member 20 which can function as the dielectric constant adjusting layer for the inlay 10, there are, e.g., a thermoplastic resin such as a polycarbonate resin, an acrylonitrile-ethylene-styrene (AES) resin, a polypropylene resin, a polyethylene resin, a polystyrene resin, an acrylic resin, a polyester resin, a polyphenylene sulfide resin, an acrylonitrile-butadiene-styrene (ABS) resin, a polyvinyl chloride resin, a polyurethane resin, a fluorine resin, or a silicone resin, and a resin material such as a thermoplastic elastomer.

Of these materials, the protective member 20 can be formed by using, e.g., a weatherproofing AES resin or a weatherproofing polycarbonate resin since such a material is superior in the weather resistance, heat resistance, water resistance, and the like and facilitates formation, processing, or the like in correspondence with the communication characteristics of the inlay 10.

Furthermore, as a shape of the protective member 20 which functions as the dielectric constant adjusting layer of the inlay 10, for example, the tabular/sheet-shaped protective member 20 can be arranged on the lower surface side of the inlay 10, this protective member 20 can be formed with a predetermined thickness, and one or more through portions (through holes) which are pierced in the protective member 20 can be provided at predetermined positions on a mounting surface of this plate on which the inlay 10 is mounted.

When the through portions are formed in this manner, the protective member 20 enables partially arranging a dielectric substance to the inlay 10 mounted thereon. Consequently, when the through portions are appropriately formed in the protective member 20 which becomes the dielectric constant adjusting layer while considering a type or communication characteristics of the inlay 10 to be used, a material of the housing 50 or the protective member 20, and various conditions such as each article which uses the RF tag 1, a use environment/available frequency band, and the like, the RF tag 1 can be used for different articles or configured to cope with different communication frequencies by selecting/replacing the protective member 20 alone.

For example, although not shown in particular, a rectangular through portion which is a size larger than a width (a length of a lateral direction) of the inlay 10 is formed at a position corresponding to the IC chip 11 and the loop part 11a of the inlay 10 at a substantial center of the protective member 20 having the inlay 10 mounted on the upper surface thereof, or different through portions are formed at corresponding positions on both sides of this central through portion.

Positions, shapes, sizes, quantities, and the like of the through portions formed in such a protective member 20 can be designed/changed while counting/considering a shape/mode of a material of the protective member 20, communication characteristics or a communication frequency of the inlay 10, and conditions such as each article which uses the RF tag 1, a use environment, a use area, and the like.

Moreover, the protective member 20 can be formed into a perfect tabular/sheet-like shape having no hole and the like without forming the above-described through portions. When such a configuration is adopted, the dielectric constant adjusting layer having a predetermined dielectric constant is arranged on one entire surface side of the inlay 10, whereby the inlay 10 can be designed to provide the excellent communication characteristics.

As described above, the protective member 20 which functions as the dielectric constant adjusting layer can be appropriately designed/changed in correspondence with a resin material to be formed, the communication characteristics of the inlay 10, each article which uses the RF tag 1, a use condition, and the like, and the through portions can be appropriately provided, or such through portions can be completely eliminated.

[Housing]

The housing 50 is protecting means for protecting the inlay 10 by housing the inlay 10 protected by the protective member 20.

In this embodiment, the inlay 10 having the upper surface/lower surface protected by the protective member 20 can be detachably housed in the housing 50.

When the inlay 10 is protected by this housing 50 and the protective member 20, the durability, the shock resistance/weather resistance/heat resistance/waterproof properties, and the like of an RF tag can be enhanced.

Specifically, as shown in FIGS. 1 to 3, the entire housing 50 is formed into a rectangular parallelepiped shape which includes the top cover 51 covering the upper surface side of the inlay 10 protected by the protective member 20 and a back cover 52 covering the lower surface side of the same.

Additionally, in this embodiment, each of the top cover 51 and the back cover 52 constituting the housing 50 is formed into a predetermined shape by using a metal material.

When the housing 50 is made of the metal, the inside of the housing can be protected by strength/durability/shock resistance of the metal housing 50 against mechanical/physical external force/impact and the like applied to the RF tag 1, and the inlay 10 housed in the housing 50 can be effectively prevented from fracturing or failing.

Here, as a metal material constituting the top cover 51 and the back cover 52 of the housing 50, for example, iron steel, copper, stainless, an aluminum alloy, a zinc alloy, or the like can be used.

It is to be noted that the housing 50 is made of the metal to provide the durability/shock resistance and the like against the mechanical/physical external force applied to the surface of the RF tag 1 and to constitute the auxiliary antenna of the inlay 10 by using the metal member arranged on the surface of the RF tag 1.

Thus, forming the top cover 51 arranged on the front surface side of the RF tag 1 by using the metal can suffice, and the back cover 52 can be made of a nonmetal, e.g., a synthetic resin.

Further, a shape/structure or the like of the outer shape of the housing 50 can be changed as long as the inlay 10 protected by the protective member 20 can be housed, and the outer shape of the housing 50 can be appropriately designed/changed in correspondence with, e.g., a structure or a size of each article which uses the RF tag 1, a use state of the tag, and the like.

In the example shown in FIG. 2, each of both end portions of the top cover 51 is bent into an L-like shape as seen in a front view while considering a thickness of the inlay 10 which is protected by the protective member 20, and a base portion 52a on which the protective member 20 protecting the inlay 10 is mounted is protruded and provided on the back cover 52. Furthermore, when such a top cover 51 and back cover 52 are overlapped, a housing space to house the inlay 10 and the protective member 20 is constituted. In this case, a front side and a back side of the housing 50 along the longitudinal direction become opening portions through which the housed inlay 10 and protective member 20 can be visually confirmed.

It is to be noted that, as shown in FIG. 2, through holes into which screws (see screws 101 shown in FIGS. 5 to 7) or the like to fix the RF tag 1 to each object are inserted can be provided in both end portions of the overlapped top cover 51 and back cover 52.

Moreover, in a state where the housing 50 is covered with the top cover 51 and the back cover 52, the housing 50 can be attached to each of articles/objects using the RF tag 1 by, e.g., the above-described screwing or an adhesive, or can be installed/fitted at a predetermined position of the article/object.

With the configurations/shapes of the top cover 51 and the back cover 52 described above, the inlay 10 and the protective member 20 housed in the housing 50 can be arranged/housed between the top cover 51 and the back cover 52 without a gap (see FIGS. 5 to 7), and the inlay 10 can be prevented from slipping or wobbling in the housing 50.

Additionally, when the shapes of the top cover 51 and the back cover 52 described above, e.g., a thickness (a height) of the L-like shape of each of both the ends of the top cover 51 or a thickness (a height) of the base portion 52a of the back cover 52 is adjusted/changed, an appropriate housing space corresponding to the thicknesses (the heights) of the inlay 10 and the protective member 20 to be housed can be constituted. Thus, for example, the base portion 52a on the back cover 52 side can be omitted, or an inwardly protruding/bulging base portion, spacer, or the like can be provided on the top cover 51 side.

Further, for example, as shown in FIGS. 3A to 3C, a shape of the top cover 51 can be appropriately changed/adjusted.

It is to be noted that, although not shown in FIGS. 3A to 3C in particular, through holes (see FIGS. 1A, 1B, and 2) into which screws or the like to fix the RF tag 1 to each object are inserted can be provided at appropriate positions of, e.g., both the end portions of the top cover 51 and the back cover 52 like those shown in FIG. 2.

FIG. 3A shows a mode depicted in FIGS. 1A, 1B, and 2, and a case where both the end portions of the top cover 51 are bent toward the back cover 52 into the L-like shape as seen in the front view while considering the thicknesses of the protective member 20 and the inlay 10.

On the other hand, as shown in FIG. 38, it is possible to adopt the top cover 51 having a dome-like shape in which edge portions on a front side and a back side of the top cover 51 (the edge portions in the longitudinal direction) are bent at substantially 90 degrees toward the front side and the back side in correspondence with the thicknesses of the protective member 20 and the inlay 10.

In this case, side surfaces of the top cover 51 in a lateral direction becomes opening portions through which the housed inlay 10 and protective member 20 can be visually confirmed.

Furthermore, as shown in FIG. 3C, the top cover 51 can be formed into a planar shape having no bent end portion/edge portion formed thereto.

In this case, one tabular top cover 51 is mounted on the upper surface of the inlay 10/protective member 20 mounted on the upper surface of the back cover 52, and four outer peripheral sides of the housing 50 become opening portions through which the housed inlay 10 and protective member 20 can be visually confirmed.

In this manner, the configuration of the top cover 51/back cover 52 constituting the housing 50 can be appropriately changed/adjusted in correspondence with a size or a thickness (a height) of the housed inlay 10 or protective member 20, an environment where the RF tag 1 is used, an attachment target, and the like.

[Auxiliary Antenna]

Moreover, in this embodiment, the top cover 51 constituting the above-described housing 50 functions as the auxiliary antenna of the inlay 10 housed in the housing 50.

The auxiliary antenna functions as an antenna to improve/adjust the communication characteristics of the above-described inlay 10, and it is usually formed of a planar conductive member which is laminated on one surface side (the upper surface side) of the inlay 10, and insulated from the inlay 10 resin-sealed by the sealing film 13.

That is, since the entire inlay 10 is resin-sealed by the sealing film 13, the auxiliary antenna formed of the conductive member such as a metal is physically insulated from the inlay 10. Additionally, when such an auxiliary antenna is directly laminated on one surface side of the inlay 10, the auxiliary antenna and the IC chip 11 of the inlay 10 are arranged to face each other through the sealing film 13 and electrically connected by a so-called capacitor coupling.

Consequently, the auxiliary antenna is laminated in a lengthwise direction (a height direction) on the inlay 10, a two-dimensional antenna is thereby constituted of the antenna 12 of the inlay 10 and the auxiliary antenna, the auxiliary antenna functions as a booster for communication radio waves, and the communication characteristics of the inlay 10 are adjusted/improved.

Additionally, in this embodiment, such an auxiliary antenna is constituted of the top cover 51 of the housing 50, which is the conductive member laminated on the upper surface side of the inlay 10.

Since the top cover 51 of the housing 50 according to this embodiment is made of a metal as described above, it becomes the conductive member arranged on the upper surface side of the inlay 10. Further, the inlay 10 is resin-sealed by the sealing film 13 and the protective member 20 (20a) made of a synthetic resin is laminated on the upper surface side of the inlay 10 in some cases, the top cover 51 is insulated from the inlay 10, and electrical connection is achieved by a so-called capacitor coupling.

Thus, when the top cover 51 is formed into a predetermined shape, the metal top cover 51 itself can function as the auxiliary antenna of the inlay 10 housed in the housing 50.

Figure 4A:
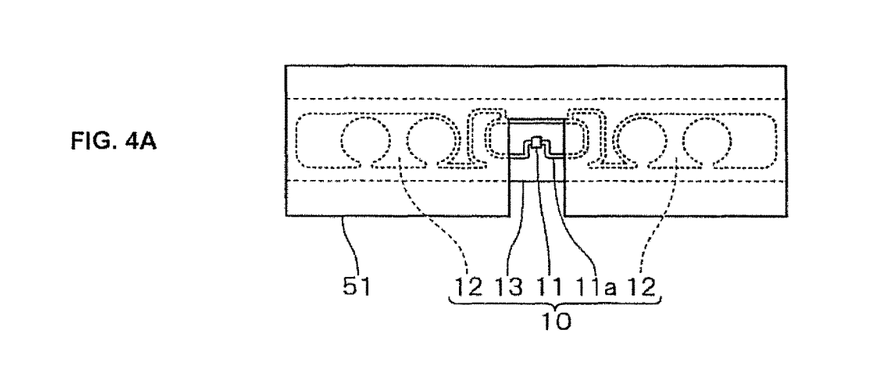
Figure 4B:
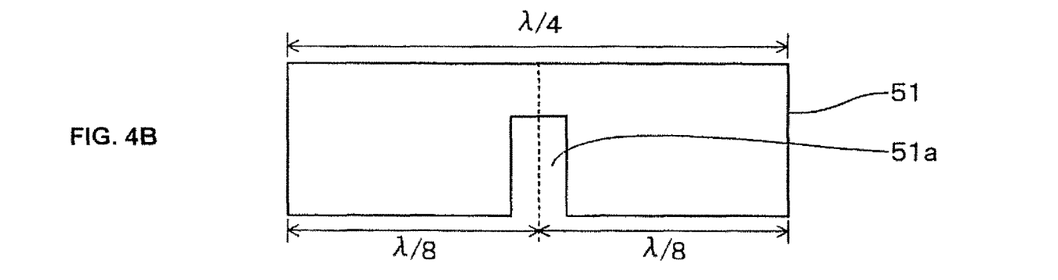

FIGS. 4A and 4B show plan views of the top cover 51 of the housing 50 which functions as the auxiliary antenna of the inlay 10. FIG. 4A shows a state where the top cover 51 is laminated on the upper surface of the inlay 10, and FIG. 4B shows a dimensional relationship of the long sides of the auxiliary antenna constituted of the top cover 51.

As shown in the drawing, in this embodiment, the auxiliary antenna constituted of the top cover 51 is formed into a rectangular/planar shape which has short sides longer than those of the inlay 10, and has long sides substantially the same as those of the inlay 10 in length.

Furthermore, as shown in FIG. 4B, each long side of the rectangle can be formed so as to have a length which is substantially ¼ of a wavelength of a radio frequency of the inlay 10.

Furthermore, a cutaway part 51a, which opens in a part on the upper surface side of the inlay 10 where one of the long sides of the rectangle is divided into two each having a length which is substantially ⅛ of the wavelength of the radio frequency of the inlay 10, can be formed in this long side.

The cutaway part 51a is formed into a concave shape which opens in an edge portion of one long side of the top cover 51 constituting the auxiliary antenna and which has a predetermined width and depth enabling arrangement of the IC chip 11 of the inlay 10.

The length of the top cover 51 constituting the auxiliary antenna defines an entire size of the RF tag 1 and, for example, when the top cover 51 is formed so as to have a length corresponding to, e.g., a ½ wavelength, a dimension is too long (too large), which is not preferable in terms of properties of the RF tag which must be reduced in size.

Thus, in this embodiment, the length of the long sides of the auxiliary antenna constituted of the top cover 51 can be formed so as to be a length which is substantially ¼ of the wavelength of the radio frequency of the inlay 10.

Here, "substantially ¼" corresponds to not only being precisely "¼ (0.25)" of the wavelength of the radio frequency but also being substantially "¼" and, for example, even a range (0.2 to 0.3) which is ±20% of the ¼ wavelength or the like corresponds to "substantially ¼" according to the present invention.

Moreover, in case of laminating the planar auxiliary antenna on the inlay 10, when the auxiliary antenna is placed on the IC chip 11 of the inlay 10 in an overlapping manner, the communication characteristics of the IC chip 11 are impaired by the conductive member forming the auxiliary antenna.

That is, the loop circuit is formed (the loop part 11a) in the vicinity of the IC chip 11 of the inlay 10, this loop part 11a is intended to achieve the impedance matching and provided to perform communication using a magnetic field component, and this magnetic field component must be prevented from being inhibited by the conductor constituting the auxiliary antenna.

Thus, in this embodiment, at the time of overlapping and laminating the top cover 51 constituting the auxiliary antenna on the inlay 10, the cutaway part 51a is formed in the top cover 51 so that the conductive member constituting the auxiliary antenna is not present at a part where the IC chip 11 is placed.

Additionally, to form this cutaway part 51a, the cutaway part 51a is formed in the top cover 51 at a position where each long side of the auxiliary antenna is divided into two each corresponding to a length which is substantially ⅛ of the wavelength of the radio frequency of the inlay 10 so that a length corresponding to substantially ¼ of the wavelength of the radio frequency of the inlay 10 which is the length of each long side of the auxiliary antenna becomes the length corresponding to substantially ⅛ of the wavelength of the radio frequency.

It is to be noted that, like the above-described case of "substantially ¼", "substantially ⅛" mentioned here corresponds to not only being precisely "⅛ (0.125)" of the wavelength of the radio frequency but also being substantially "⅛" and, for example, even a range (0.1 to 0.15) which is ±20% of the ⅛ wavelength or the like corresponds to "substantially ⅛" according to the present invention.

Further, as a size (a width and a depth) of the cutaway part 51a provided in the top cover 51, at least a size which prevents the presence of the top cover 51 (the auxiliary antenna) overlapping the IC chip 11 of the inlay 10 can suffice, and the impedance matching can be achieved by appropriately adjusting the width and the depth of this cutaway part 51a in correspondence with, e.g., an influence of the radio frequency of the IC chip 11, a later-described material of the housing 50, and each article to which the RF tag 1 is attached.

Thus, the cutaway part 51a could have at least a size which enables arranging the IC chip 11, and it could have the width and the depth which can be appropriately adjusted/changed in a range of the size of the top cover 51 (the auxiliary antenna).

More specifically, for example, when the communication frequency of the inlay 10 is 920 MHz, λ≈326.0 mm, λ/4≈81.5 mm, and λ≈40.8 mm are provided. Thus, the auxiliary antenna constituted of the top cover 51 is formed in such a manner that the length of the long sides becomes approximately 81.5 mm, and one long side at which the cutaway part 51a is formed is divided into two each having a length of approximately 40.8 mm.

The dielectric constant adjusting plate on which the inlay and the auxiliary antenna are laminated produces a wavelength reducing effect, and an apparent wavelength is reduced by using this plate. Its dielectric constant is approximately "2 to 4".

Thus, the length of the long sides of the auxiliary antenna constituted of the top cover 51 in this embodiment is an approximate value, a value which is substantially λ/4 or substantially λ/8 can suffice, and the length slightly varies in correspondence with a change in communication characteristics due to a material of the housing 50 of the RF tag 1, a use environment of the tag, a use mode, and the like in some situations.

Furthermore, the cutaway part 51a formed in the top cover 51 constituting the auxiliary antenna is set with reference to a dimension of the inlay 10 to be used, and it is formed so as to have a width and a depth with which the conductive member of the top cover 51 (the auxiliary antenna) does not overlap the IC chip 11 portion of the inlay 10.

Specifically, the width of the cutaway part 51a is first set with reference to the width of the loop part 11a of the IC chip 11 of the inlay 10, and the cutaway part 51a is formed so as to have a dimension with which the top cover 51 does not overlap the IC chip 11 and the loop part 11a or it overlaps a part of a peripheral edge of the loop part 11a without overlapping the IC chip 11. For example, when a width size of the loop part 11a is approximately 15 to 18 mm, the width of the cutaway part 51a has a length falling in a range of approximately 10 to 20 mm.

In addition, the depth of the cutaway part 51a is set with reference to a width of the inlay 10 (the length in the lateral direction) and a position of an upper portion of the loop part 11a so that the top cover 51 does not overlap at least the IC chip 11. For example, when the width of the inlay 10 is approximately 10 to 30 mm, the depth of the cutaway part 51a has a length falling in a range of approximately 5 to 20 mm.

[Lamination Pattern of Inlay/Auxiliary Antenna]

A specific lamination/arrangement pattern of the inlay 10 and the protective member 20 in the housing 50 of the RF tag 1 according to this embodiment having the above-described configuration will now be described with reference to FIGS. 5 to 7.

FIGS. 5A to 5C are cross-sectional front views each showing the RF tag 1 according to an embodiment of the present invention and showing a case where the RF tag 1 is attached to an object 100 which is an attachment target and screwed by screws 101, and lamination configurations of the inlay 10 and the protective member 20 in the housing 50 are different.

In the RF tag 1 shown in FIG. 5A, the inlay 10 is sealed/hermetically closed in the protective member 20 made of a synthetic resin by in-mold molding.

With this configuration, since the entire inlay 10 is protected in a state where it is covered with the protective member 20, for example, the inlay 10 does not get wet even if rainwater, dirt, dust, or the like enters from the cutaway part 51a of the top cover 51 of the housing 50, and the water resistance, the weather resistance, the heat resistance, and the like of the RF tag 1 can be improved.

In the RF tag 1 shown in FIG. 5B, the protective member 20 made of a synthetic resin is welded all over between the top cover 51 of the housing 50 and the back cover 52 having the inlay 10 mounted thereon.

With this configuration, the entire inlay 10 is covered/hermetically closed with the protective member 20 made of the synthetic resin in a state where the inlay 10 is mounted on the back cover 52, the inlay 10 does not get wet even if moisture enters from the cutaway part 51a of the top cover 51 like the example shown in FIG. 5A, and the water resistance, the weather resistance, the heat resistance, and the like of the RF tag 1 can be improved.

In the RF tag 1 shown in FIG. 5C, the protective member 20 formed into a lid-like shape is fitted in an outer edge of the base portion 52*a* of the back cover 52 having the inlay 10 mounted thereon from the upper side of the inlay 10.

With this configuration, just fitting the lid-like protective member 20 into the base portion 52*a* of the back cover 52 enables protecting/hermetically closing the inlay 10 and facilitating an assembling operation/manufacturing process, and fitting the lid-like protective member 20 in the base portion 52*a* of the back cover 52 without a gap enables separating the inlay 10 from, e.g., the moisture like the examples of FIGS. 5A and 5B, and the water resistance, the weather resistance, the heat resistance, and the like of the RF tag 1 can be improved.

Figure 6A:
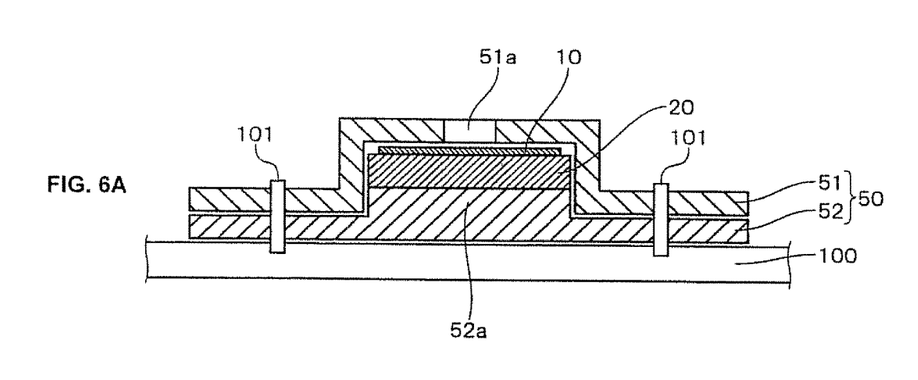
Figure 6B:
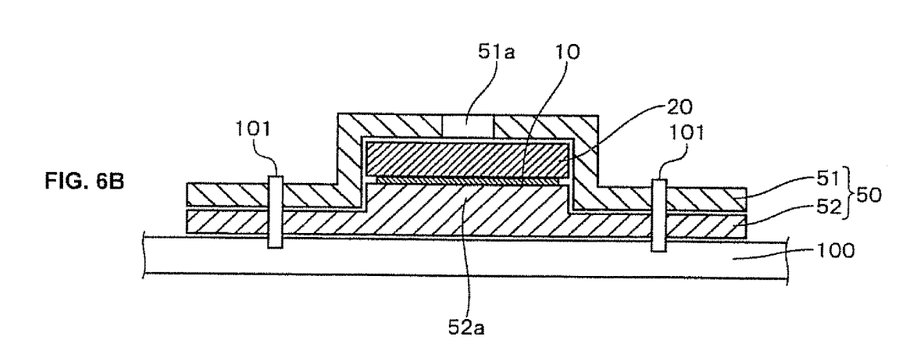

FIGS. 6A and 6B are cross-sectional front views each showing the RF tag 1 according to an embodiment of the present invention, and showing a case where the RF tag 1 is fixed to the object 100 by the screws 101 and a lamination pattern of the inlay 10 and the protective member 20 in the housing 50 differs like the examples in FIGS. 5A to 5C.

FIG. 6A shows a case where the tabular protective member 20 is arranged only on the lower surface side of the inlay. With this arrangement, a distance between the object 100 and the inlay 10 can be increased by an amount corresponding to a thickness (a height) of the protective member 20, and an influence of the object 100 on the inlay 10 can be reduced/suppressed when the object 100 is, e.g., a metal, thereby improving the communication performance of the RF tag 1.

Moreover, according to such a lamination pattern, the inlay 10 can be arranged to directly face the cutaway part 51*a* of the top cover 51, the inlay 10 is exposed to the outside through the cutaway part 51*a*, and hence the communication performance of the inlay 10 can be improved in this regard.

On the other hand, FIG. 6B shows a case where the tabular protective member 20 is arranged only on the upper surface side of the inlay.

With this arrangement, like the examples shown in FIGS. 5A to 5C, the upper surface of the inlay 10 can be covered with the protective member 20, the inlay 10 is not directly exposed from the cutaway part 51*a* of the top cover 51, and the inlay 10 can be protected from the external environment, e.g., penetration of rainwater.

Additionally, in this case, since the distance between the inlay 10 and the object 100 is shorter than that in the example shown in FIG. 6A, it is possible to adopt the object 100 which is a nonmetal object or the like and configured not to affect the communication characteristics of the inlay 10.

In this manner, as the protective member 20 according to this embodiment, one which protects at least one of the upper surface and the lower surface of the inlay 10 can suffice.

FIGS. 7A to C show cases where the protective member 20 which protects the upper surface of the inlay 10 includes a convex portion 21 which closes the cutaway part 51*a* of the top cover 51 of the housing 50 in the RF tag 1 according to an embodiment of the present invention, respectively.

As shown in FIGS. 7A and 7B, in a case where the protective member 20 is arranged on the upper surface side of the inlay 10, the convex portion 21 which engages with the cutaway part 51*a* of the top cover 51 can be provided on the upper surface of the protective member 20.

According to this configuration, the cutaway part 51*a* of the top cover 51 can be closed with the convex portion 21 of the protective member 20, the inlay 10 is not directly exposed through the cutaway part 51*a* of the top cover 51, and the inlay 10 can be protected from the external environment, e.g., penetration of rainwater like the examples shown in FIGS. 5A to 5C and FIG. 6B.

FIG. 7C shows a case where the cutaway part 51*a* of the top cover 51 is formed on one end side of the housing 50 in the longitudinal direction.

The cutaway part 51*a* of the top cover 51 is an opening portion provided in correspondence with a position of the loop part 11*a* of the inlay 10. Thus, when the loop part 11*a* of the inlay 10 is arranged on, e.g., one end side in the longitudinal direction, the cutaway part 51*a* of the top cover 51 can be also formed on the one end side in the longitudinal direction in correspondence with this arrangement.

As such a mode, for example, a part of the antenna 12 (one side in the longitudinal direction) is cut while keeping the loop part 11*a* of the inlay 10. Thus, for example, the long inlay 10 can be shortened from its original length in the longitudinal direction.

In such a case, since the loop part 11*a* of the inlay 10 is arranged on, e.g., one end side in the longitudinal direction when a part of the antenna 12 is cut, the cutaway part 51*a* provided in the top cover 51 of the housing 50 can be formed at a position corresponding to the loop part 11*a* of the inlay 10 (the one end side in the longitudinal direction).

Furthermore, in this case, as shown in FIG. 7C, like the example shown in FIGS. 7A and 7B, when the convex portion 21 which engages with the cutaway part 51*a* of the top cover 51 is provided on the upper surface of the protective member 20, the cutaway part 51*a* can be closed with the convex portion 21 of the protective member 20.

In this manner, the cutaway part 51*a* formed in the top cover 51 or the convex portion 21 of the protective member 20 which engages with the cutaway part 51*a* is provided in correspondence with the position of the loop part 11*a* of the inlay 10, and such a portion can be provided at an arbitrary position corresponding to the loop part 11*a* without being restricted the one end side in the longitudinal direction shown in FIG. 7C.

[Communication Characteristics]

The communication characteristics of the RF tag 1 according to this embodiment having the above-described configuration will now be described with reference to FIGS. 8A to 8C.

Figure 8A:
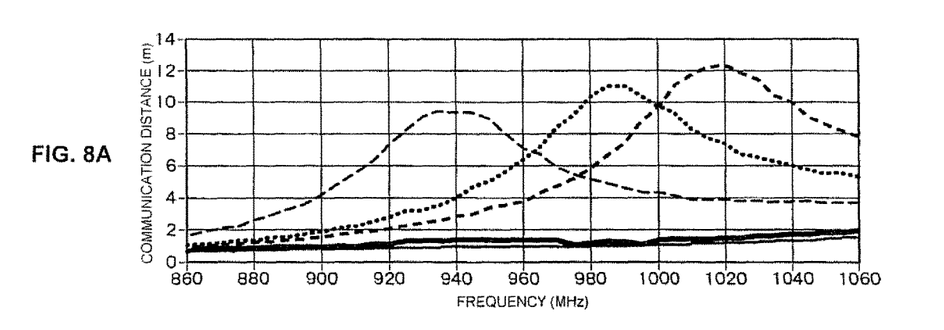
Figure 8B:
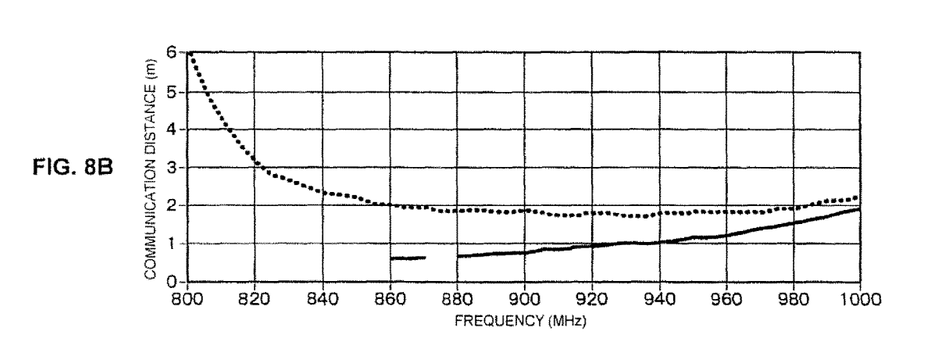
Figure 8C:
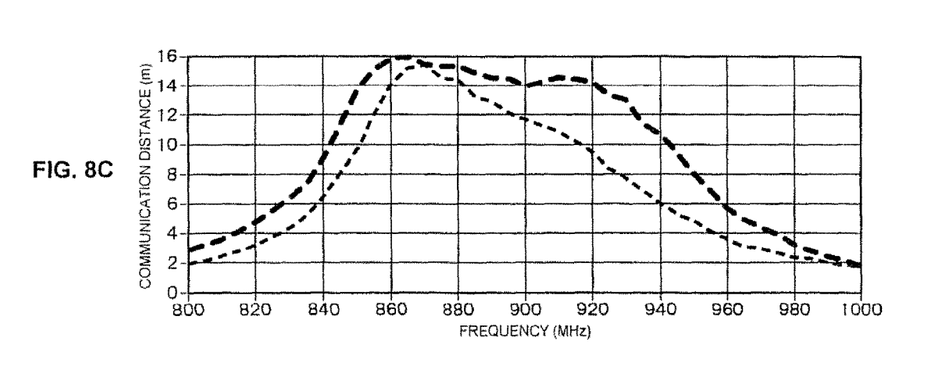

FIGS. 8A to 8C are line charts showing the communication characteristics of the RF tag according to an embodiment of the present invention and showing a relationship between a communication distance and a frequency, respectively.

First, FIG. 8A shows a relationship between a communication distance and a frequency when the RF tag 1 according to an embodiment of the present invention shown in FIGS. 5A to 5C is attached to the metal object 100.

As shown in the drawing, in case of attaching each of the three RF tags 1 to the metal object 100, when the object 100 is insulated from the RF tags 1, peaks (approximately 8 to 12 m) of the communication distance can be provided in a band of 920 to 960 MHz, a band of 980 M to 1000 MHz, and a band of 1000 M to 1040 MHz as indicated by broken lines in FIG. 8A, respectively.

In this case, as to the insulation of each RF tag 1 and the object 100, for example, when the back cover 52 of the housing 50 is made of a non-conductive synthetic resin or a non-conductive material, e.g., a sheet or a tabular member made of a synthetic resin is held between the metal back cover 52 and the object 100, such communication performance as indicated by the broken lines in FIG. 8A can be provided.

On the other hand, when each RF tag 1 and the object 100 are conductive with each other without being insulated, as indicated by solid lines in FIG. 8A, the communication performance is considerably deteriorated in any frequency band, and the wireless communication becomes difficult to perform or disabled.

FIG. 8B shows the communication performance when the RF tag 1 is fixed to the metal object by screwing.

In case of fixing the RF tag 1 to the object 100 by screwing, when the screws 101 (see FIGS. 5 to 7) are made of a metal, the object 100 and the RF tag 1 become electrically conductive with each other through the screws 101 in some situations.

In such a case, as indicated by a solid line in FIG. 8B, the communication performance of the RF tag 1 is deteriorated, and the wireless communication becomes difficult to perform or disabled.

Thus, in such a case, the RF tag 1 can be fixed to the object 100 by using the nonconductive screws 101 or fixing means other than the screws, e.g., an adhesive tape or an adhesive.

By doing so, as indicated by a broken line in FIG. 8B, the wireless communication is enabled in a predetermined frequency band. In the example shown in FIG. 8B, as indicated by the broken line, a peak (approximately 6 m) of the communication distance can be provided in a band of 800 to 820 MHz.

As described above, in the RF tag 1 according to this embodiment, the housing 50 is attached and fixed to each metal attachment target (the object 100), the communication characteristics of the RF tag 1 can be excellently maintained/improved by providing insulating means (or an insulator) to insulate the housing 50 from the attachment object.

FIG. 8C shows a case where the communication characteristics of the RF tag 1 in FIG. 6A are compared with the counterpart in FIG. 6B.

As shown in FIGS. 6A and 6B, in the RF tag 1 according to this embodiment, the protective member 20 can be arranged only on the lower surface side of the inlay 10 or arranged only on the upper surface side of the inlay 10. Further, in any case, as shown in FIG. 8C, the RF tag 1 can perform the wireless communication with the excellent communication performance.

In the example shown in FIG. 8C, the RF tag 1 in FIG. 6A can provide a peak (approximately 15 m) of the communication distance in a band of 860 to 880 MHz as indicated by a thin broken line, and the RF tag 1 in FIG. 6B can provide a peak (approximately 16 m) of the communication distance in a band of 860 to 920 MHz as indicated by a thick broken line.

As described above, according to the RF tag 1 of this embodiment, as to the housing 50 which becomes the protecting means to house/protect the inlay 10, at least the top cover 51 of the housing 50 which houses the inlay 10 is formed of the metal member, thus the durability, the shock resistance, the pressure resistance, and the like against physical force such as impact or a pressure applied to the housing 50 from the outside can be improved.

This configuration prevents the inlay 10 from, e.g., failing/fracturing by the external force or impact.

Furthermore, in this embodiment, in order for such a metal housing 50 itself to function as the auxiliary antenna for the inlay 10, the metal top cover 51 includes the cutaway part 51a which opens in a part of the upper surface side of the inlay 10, the cutaway part 51a includes the cutaway part 51a which opens on the upper surface side of the loop circuit of the inlay 10, and the metal top cover 51 is electrically connected with the inlay 10 by a so-called capacitor coupling.

Consequently, the top cover 51 of the metal housing 50 which protects the inlay 10 can effectively function as the auxiliary antenna of the inlay 10, and the communication characteristics of the RF tag 1 can be maintained in/improved to the excellent state.

As described above, according to the RF tag 1 of this embodiment, since the inlay 10 including the IC chip 11 and the antenna 12 is housed in the metal housing 50 which functions as the auxiliary antenna, the housing 50 itself function as the auxiliary antenna while assuredly protecting the inlay 10, the antenna 12, and the IC chip 11 from physical/mechanical external force, impact, or the like by the metal housing 50, thus the wireless communication can be performed between the inlay 10 and the outside of the housing 50 in the excellent state.

Therefore, for example, the present invention can be used as the RF tag 1 which is attached to each of objects, e.g., a freight pallet or container to which physical force or impact is often applied from the outside.

Although one or more embodiments of the RF tag and the metal container according to the present invention have been described above, the RF tag according to the present invention is not restricted to the foregoing embodiment, and it is needless to say that various changes can be made within a scope of the present invention.

For example, in the foregoing embodiment, although the example of the freight pallet or container has been described as each of articles which use the RF tag according to one or more embodiments of the present invention, the articles and the objects which use the RF tag according to the present invention are not restricted to the freight pallet or container.

That is, the RF tag according to the present invention can be applied to any articles/objects as long as they are articles/objects which use the RF tag and from/to which predetermined information/data is read/written through the reader/writer.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Contents of the reference literature described in this specification and a specification of a Japanese application which forms a basis for a priority of this application under the Paris convention are cited herein.

One or more embodiments of the present invention can be used as the RF tag which is attached to each of arbitrary articles and objects, e.g., a freight pallet or container and has the configuration that the inlay of the RF tag is housed/sealed in the metal housing to enhance the durability, the impact resistance, and the like.

REFERENCE SIGNS LIST

1 RF tag
10 inlay
11 IC chip
11a loop part
12 antenna
13 sealing film 20 protective member
21 convex portion
30 dielectric constant adjusting plate
50 housing
51 top cover
51a cutaway part
52 back cover

What is claimed is:

1. An RF tag comprising:

an inlay comprising an IC chip, a loop part, an antenna, and an insulator; and a housing that houses the inlay therein, wherein the loop part is a loop-shaped conductor that surrounds the IC chip, the antenna is connected to the IC chip through the loop part, the inlay is entirely sealed by the insulator, the housing comprises a top cover that covers at least an upper surface side of the inlay, the top cover is made of a predetermined metal material and is electrically connected to the inlay by a capacitor coupling to function as an auxiliary antenna of the inlay, the top cover comprises a cutaway, and the cutaway opens in the upper surface side of the inlay and partially overlaps the loop part.

2. The RF tag according to claim 1, wherein the loop part forms a loop circuit adjacent to the IC chip, and the cutaway opens on an upper surface side of the loop circuit of the inlay.

3. The RF tag according to claim 1, further comprising a protective member that covers the upper surface or a bottom surface of the inlay.

4. The RF tag according to claim 3, wherein the protective member comprises a convex portion that engages with the cutaway when the protective member covers the upper surface of the inlay.

5. The RF tag according to claim 1, further comprising an insulator that insulates the housing from a metal attachment target, when the housing is attached to the attachment target.

* * * * *